United States Patent [19]

Kühnel

[11] Patent Number: 4,619,140

[45] Date of Patent: Oct. 28, 1986

[54] CIRCUIT ARRANGEMENT FOR THE ELECTROTHERMAL MEASUREMENT OF LEVEL

[75] Inventor: Frank Kühnel, Eschborn, Fed. Rep. of Germany

[73] Assignee: VDO Adolf Schindling AG, Frankfurt am Main, Fed. Rep. of Germany

[21] Appl. No.: 659,584

[22] Filed: Oct. 10, 1984

[30] Foreign Application Priority Data

Oct. 18, 1983 [DE] Fed. Rep. of Germany ....... 3337779

[51] Int. Cl.$^4$ ........................................... G01F 23/24
[52] U.S. Cl. .................................. 73/295; 73/304 R; 340/622; 374/172
[58] Field of Search ............ 73/304 R, 295; 307/310; 328/3; 340/622; 377/25; 374/164, 172, 185

[56] References Cited

U.S. PATENT DOCUMENTS

| 4,163,391 | 8/1979 | Bezard et al. | 73/295 |
| 4,319,233 | 3/1982 | Matsuoka et al. | 73/295 |
| 4,361,037 | 11/1982 | Hauschild et al. | 73/295 |
| 4,425,795 | 1/1984 | Albrecht et al. | 73/295 |
| 4,449,404 | 5/1984 | Böhme et al. | 73/295 |
| 4,513,616 | 4/1985 | Bezard et al. | 73/295 |
| 4,525,850 | 6/1985 | Miller | 73/304 R |
| 4,558,456 | 10/1985 | Bezard et al. | 73/295 |

FOREIGN PATENT DOCUMENTS 3115776  1/1983  Fed. Rep. of Germany .
3134912  3/1983  Fed. Rep. of Germany .

Primary Examiner—Charles Frankfort
Assistant Examiner—Thomas B. Will
Attorney, Agent, or Firm—Martin A. Farber

[57] ABSTRACT

In a circuit arrangement for the electrothermal measurement of level with a resistance sensor (1) which can be fed by a source of constant current (3), a flow-of-operation control (12) for timed operation of the circuit arrangement in scanning periods is provided. By the flow-of-operation control the resistance sensor is heated periodically, namely only during a heating time ($t_0$ to $t_1$) at the start of a scanning period. By the flow-of-operation control the compensation voltage is, in this connection, detected by the resistance sensor and provisionally stored. At the end of the heating time another detection is effected, this time of the measurement voltage. By dividing the measurement voltage by the compensation voltage a value which is analogous to the level of a fluid surrounding the resistance sensor is formed. This value contains practically no disturbing variables.

4 Claims, 3 Drawing Figures

CIRCUIT ARRANGEMENT FOR THE ELECTROTHERMAL MEASUREMENT OF LEVEL

FIELD AND BACKGROUND OF THE INVENTION

The invention relates to a circuit arrangement for the electrothermal measurement of level with a resistance sensor heated by a constant current, having an evaluation circuit which evaluates a measurement voltage which is dependent on the state of immersion of the resistance sensor, into which circuit a compensation voltage can also be fed for compensation of the temperature.

For the electrothermal measurement of level there is used, as is known, an elongated conductor having the highest possible temperature coefficient, arranged within a container approximately perpendicular to the surface of the liquid whose level is to be measured. In the present case we are concerned, in particular, with the measurement of the level in automobile gas tanks.

For the known electrothermal measurement of level, the elongated conductor, namely the resistance sensor, is continuously heated with a current which is as constant as possible. The measured resistance of the resistance sensor depends in this case on the removal of heat via the so-called thermal resistance, which in its turn is dependent on the level. The measured resistance is determined as the drop in measurement voltage which takes place on the resistance sensor.

In general, the voltage measurement, however, is dependent not only on the level but also on other factors which interfere with the accuracy of the measurement. Aside from variations in the coefficient of resistance of the individual measurement sensors and in the current heating the sensor, which current should be as constant as possible, the accuracy of the measurement is substantially affected by the surrounding temperature to which the measurement sensor is exposed.

In order to eliminate the disturbing influence of the surrounding temperature as far as possible, various compensation circuits are known, all of which make use of at least one additional compensation resistance.

In one such known circuit arrangement (Federal Republic of Germany No. OS 31 34 912), the compensation resistance dips into the liquid whose level is to be measured. The compensation resistance is also connected to the source of constant current which feeds the measurement resistor or measurement sensor. The measurement signal derived from the measurement sensor and the compensation signal produced on the compensation resistor are processed in the evaluation circuit, their difference being formed. The current through the measurement resistor is controlled as a function of the temperature measured with it. The compensation resistor and the measurement resistor are connected in series to the source of constant current. In this circuit arrangement, however, a special lead to the compensation resistor within the container or gas tank of the car must be provided with a connection. The temperature coefficient of the compensation resistor must be adapted accurately to the measurement resistor of the measurement sensor.

These disadvantages are present, partly to an even greater extent, in another known thermoelectric level measurement device (Federal Republic of Germany No. OS 31 15 776), in which a first resistance sensor is surrounded by the material in the container, a second resistance sensor is partly surrounded by the material in the container and partly by a free space located above it, and a third resistance sensor is surrounded only by the free space. These three resistance sensors are connected electrically in series and connected as a series circuit to a source of supply voltage. A current regulator is arranged in series with the three resistance sensors. A control input of the current regulator is connected to the evaluation circuit. A series connection of three comparison resistors is connected in parallel to the series connection of the three resistance sensors. The voltage difference between a junction point of two resistance sensors and a junction point of two comparison resistors, which difference controls the current regulator, is determined by an operational amplifier. In this circuit arrangement, therefore, a total of three resistance sensors and three comparison sensors must be adapted to each other and at least three if not four wires must be extended out of the container the level in which is to be measured.

In another known circuit arrangement for the measurement of level (VDO Paper, SAE Technical Paper Series 830106, Haub et al), the resistance sensor is connected, in series with a compensation resistor, to one input of an inverting amplifier for compensation of the temperature. The compensation resistor should be preferably arranged in the vicinity of the resistance sensor and be traversed by a current which is as small as possible, so as to avoid heating. However, if the compensation resistor is arranged in the container in the vicinity of the resistance sensor, it is necessary, in this case also, for an additional connection to be brought out. Furthermore, it has been found difficult in practice to find a compensation resistor having the same temperature coefficient as the measurement sensor.

The object of the present invention, therefore, starting from a circuit arrangement for the electrothermal measurement of level of the aforementioned type, is to improve this circuit in such a manner as to reduce or avoid difficulties in the adaptation or selection of resistance sensor and compensation resistor. In this connection the simplest possible wiring path is desired, particularly in the region of the container, i.e. the number of required lead wires should be as small as possible.

SUMMARY OF THE INVENTION

According to the invention, a flow-of-operation control (12) is provided for an operation of the circuit arrangement which is broken down into scanning periods, in which the resistance sensor (1) can be heated with a constant current during a heating time ($t_1-t_0$) at the start of one scanning period and the compensation voltage can be detected from one and the same resistance sensor at the start of the heating time and stored while the measurement voltage can be detected at the end of the heating time, and the evaluation circuit (4–8) is adapted to form the quotient of the measurement voltage divided by the compensation voltage during each scanning period.

The essence of the invention resides in the fact that, in this case, the measurement resistance is not determined in a quasi-steady state of the resistance sensor in which the resistance sensor which is heated by a continuous constant current has come to a temperature close to the final temperature which can be reached as a function of the level and the surrounding temperature. Rather, in this case the measurement resistance is determined at a predetermined point of time, in each case after the connecting of the constant current, and is compared with a compensation resistance which the resistance sensor has in each case at the start of the connecting of the constant current. These processes are repeated during scanning periods in order to detect changes in level.

It is necessary in this method that the scanning ratio, i.e. the ratio of the heating time to the following cooling time of the resistance sensor, be sufficiently low for the resistance sensor to have cooled sufficiently in each case by at the start of the heating time.

This method of compensation is particularly accurate since the disturbing influences are detected here on one and the same element, namely the resistance sensor, and not by at least one additional compensation element which inherently has properties different from the resistance sensor and is subjected to more or less different influences. Since there is no separate compensation element, and particularly no compensation resistor, no additional lead wires and connections for it need be provided either.

The circuit arrangement of the invention is therefore characterized by a high accuracy and a low circuit expense, particularly in the region of the container or tank.

Within the evaluation circuit, the drop in voltage occurring on the resistance sensor and detected at a predetermined time after the start of the heating is compensated for in the manner that it is divided by the compensation voltage which was determined at the start of the scanning period and provisionally stored. In this way all disturbing influences are removed from the result of the measurement.

Another advantage is that the demands on the source of constant current can also be less stringent than in ordinary circuit arrangements for the electrothermal measurement of level, since variations in current are also in part compensated for by the circuit of the invention.

The circuit arrangement, and particularly the evaluation circuit, can be developed both as analog circuit and as digital circuit:

An analog circuit has the advantage that the voltages, particularly the compensation voltage, can be stored at little expense by scanning circuits having a capacitor ("sample-and-hold" circuits).

On the other hand, upon digital processing of the measurement voltage and the compensation voltage, the division operation can be carried out in more suitable manner. A prerequisite for this is an analog-digital converter with which the measurement voltage and the compensation voltage are converted into corresponding digital numbers. In this case also the principle of the invention is advantageous since the reference value of the digitizing can vary without any disturbing influence on the result of the division, or the quotient, which means that a relatively inexpensive analog-digital converter of simpler construction can be used.

The part of the circuit in which a storing scanning circuit (9), also controlled by the flow-of-operation control (12), is connected to the output of the evaluation circuit (4–8) and has the task of storing the quotient formed from the measurement voltage and compensation voltage in each case until renewed formation of the quotient in the next scanning period. This part of the circuit can also be developed as a digital circuit. The flow-of-operation control and the entire evaluation circuit can be realized in particularly advantageous manner in a microprocessor.

Further according to the invention, the measurement voltage and the compensation voltage can be fed into an analog-digital converter to whose output digital storage and a digital arithmetic circuit for the formation of the quotient are connected.

With the above and other objects and advantages in view, the present invention will become more clearly understood in connection with the detailed description of a preferred embodiment, when considered with the accompanying drawings, of which:

BRIEF DESCRIPTION OF THE DRAWINGS

FIG. 1 shows a resistance sensor 1 which can be connected via a controlled switch 2 to a source of constant current 3. Two inputs 4 and 5 of a quotient former 6 as evaluation circuit are also connected to the probe 1, namely the input 5 directly and the input 4 via a storing scanning circuit 7.

Figure 1:
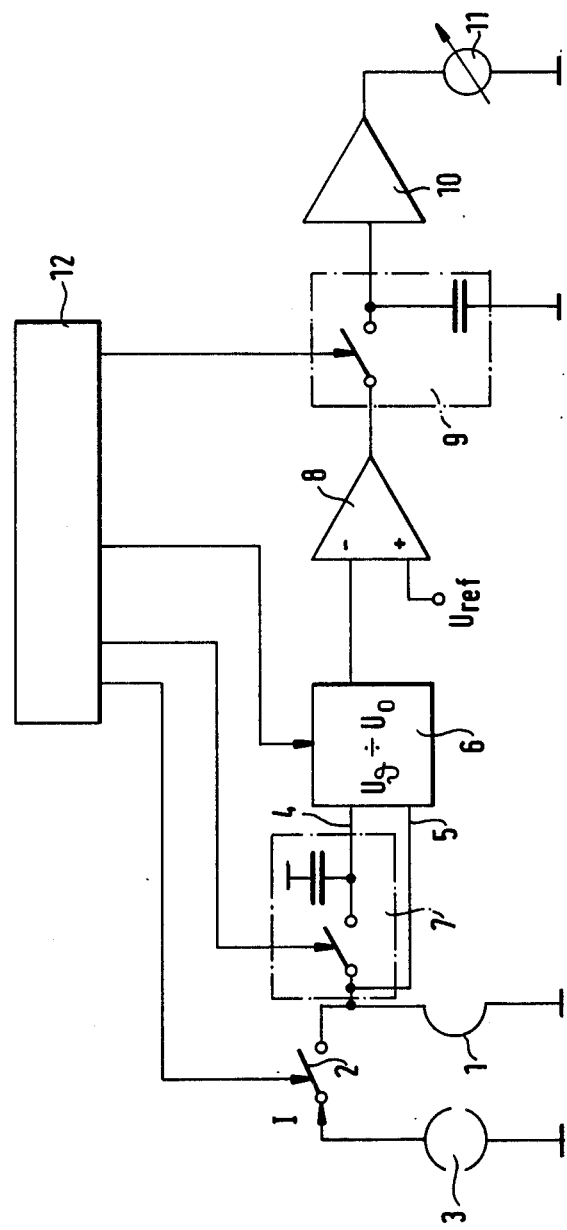
FIG. 1 is a simplified wiring diagram of the analog circuit, FIG. 3 showing an alternative digital form.

An output of the quotient former is connected to an input of an operational amplifier 8 whose second input is acted on by a reference voltage $U_{ref}$. The operational amplifier is connected as inverter with respect to the output of the quotient former.

On the output side, the operational amplifier 8 is connected, via a second storing scanning circuit 9, to a second amplifier 10, which acts on an indicating instrument 11.

The controlled switch 2 and the two storing scanning circuits 7 and 9 are controlled by a flow-of-operation control 12. The control results from the following functional description given with reference to FIG. 2: .

Figure 2:
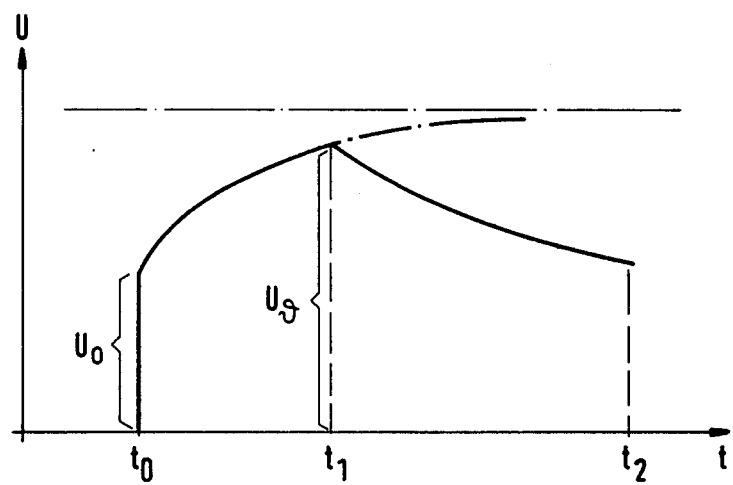
FIG. 2 shows the variation of the voltage at the resistance sensor which is contemplated in accordance with the invention.

FIG. 2 shows the variation of the voltage on the resistance sensor 1 as a function of time.

At the time $t_0$, the switch 2 is closed and the constant current flowing through the resistance sensor 1 permits the occurrence of a sudden drop in voltage $U_0$. This voltage drop is the compensation voltage which is provisionally stored by brief closing of the storing scanning circuit 7.

In the course of the further heating of the resistance sensor by the constant current, the voltage drop increases in accordance with an equalizing function corresponding to the positive temperature coefficient. Upon sufficient change in this voltage drop, it is detected as measurement voltage $U\theta$, present at the input 5 of the quotient former, and is used to form the quotient with the provisionally stored compensation voltage $U_0$: time $t_1$. The switch 2 is then opened so that the resistance sensor can cool down and the storing scanning switch 7 is reset.

The quotient formed in the quotient former 6 is inverted and subtracted from a reference voltage $U_{ref}$ in order to form a value analogous to the level. This value is provisionally stored after conclusion of the formation of the quotient upon actuation of the second storing scanning circuit 9 and, after amplification or impedance-conversion by the second amplifier 10, is displayed in the indicating instrument 11.

This indication is retained until the end of the cooling time $t_2$ as a result of the second storing scanning circuit. At the time $t_2$, the second storing scanning circuit is reset and a new scanning period commences at the time $t_0$, shown with a closing of the switch 2 and of the first storing scanning circuit for the provisional storage of the compensation voltage which now occurs.

A scanning period therefore consists of the heating time from $t_0$ to $t_1$ and of a cooling time from $t_1$ to $t_2$. Both times must be sufficiently large so that the resistance sensor has been heated for a sufficient heating time to effect a usable measurement but, on the other hand, has again substantially cooled down before a new heating time commences. The scanning period is determined thereby. Therefore it is not endeavored with this circuit arrangement to obtain a quasi-steady final temperature of the resistance sensor as in the case of the continuous connection of the source of constant current. By the dividing of the measurement voltage by the compensation voltage the disturbing influences of the initial resistance at the time $t_0$ are done away with, as well as to a substantial extent influences of a completely constant current and of changes in the temperature coefficient.

Figure 3:
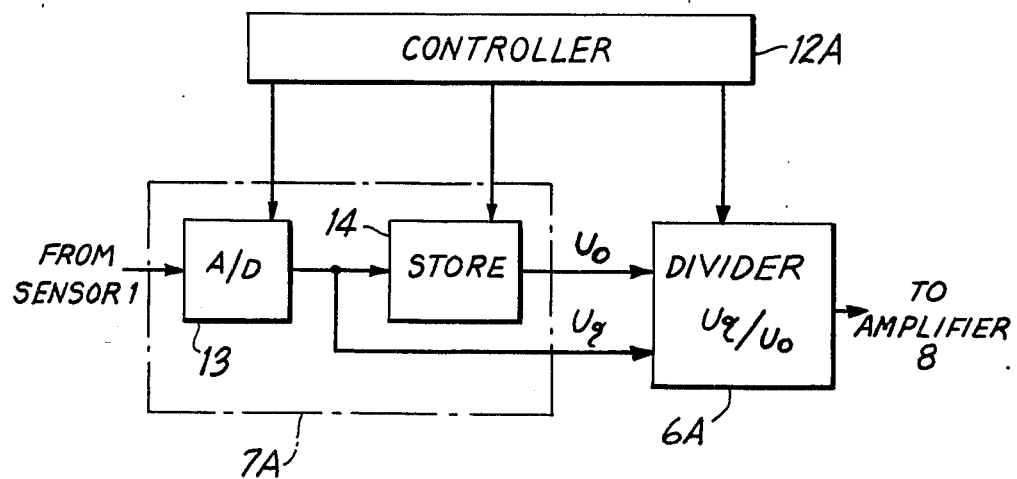

FIG. 3 shows the alternative digital embodiment wherein the quotient former 6 is replaced by a digital arithmetic circuit 6A, and the storing scanning circuit 7 is replaced by a digital storage circuit 7A comprising an analog-digital converter 13 and a storage unit 14. Both the converter 13 and the unit 14 are understood to be operated in response to suitable timing signals from a controller 12A functioning in a manner corresponding to the flow-of-operation control 12. The converter 13 receives a signal from the sensor 1, and converts the sensor signal to digitalized form which is applied directly (measurement signal) to the circuit 6A and also via the storage unit 14 (compensation signal) to the circuit 6A. The storage unit 14 stores the value of the sensor signal at the start of the heating interval and outputs the stored signal to the circuit 6A at the end of the heating interval, at which time the circuit 6A divides the measurement signal by the compensation signal. The resulting quotient is applied by the circuit 6A to the amplifier 8.

It is to be understood that the above-described embodiment of the invention is illustrative only, and that modifications thereof may occur to those skilled in the art. Accordingly, this invention is not to be regarded as limited to the embodiments disclosed herein, but is to be limited only as defined by the appended claims.

I claim:

1. In an electrical measurement circuit for electrothermal measurement of a level of a liquid by use of a resistance sensor heated by a constant electric current, said measurement circuit including an evaluation circuit for evaluating a measurement voltage which is dependent on a state of immersion of the resistance sensor in the liquid, into which circuit a compensation voltage is also feedable for compensation of temperature, the improvement comprising control means for operating said measurement circuit arrangement during a sequence of scanning periods;

means for heating said resistance sensor with a constant current during a heating interval at the start of one of said scanning periods;

means for detecting a measurement voltage from said resistance sensor at the start of the heating interval and at the end of the heating interval;

means coupled to said detecting means for storing a value of the measurement voltage detected at the start of the heating interval to serve as a compensation voltage; and wherein said evaluation circuit includes means for forming a quotient of the measurement voltage, detected at the end of the interval, divided by the compensation voltage during each scanning period.

2. The electrical measurement circuit as set forth in claim 1, further comprising a storing scanning circuit controlled by said control means, and connected to the output of the evaluation circuit.

3. The electrical measurement circuit as set forth in claim 1, wherein said detecting means comprises an analog-digital convertor, said storing means comprises a digital storage, and said quotient forming means comprises a digital arithmetic circuit; and wherein the measurement voltage and the compensation voltage are fed into said analog-digital converter, the output of said converter being coupled via said digital storage to said digital arithmetic circuit for the formation of the quotient.

4. The electrical measurement circuit as set forth in claim 2, wherein said detecting means comprises an analog-digital convertor, said storing means comprises a digital storage, and said quotient forming means comprises a digital arithmetic circuit; and wherein the measurement voltage and the compensation voltage are fed into said analog-digital converter, the output of said converter being coupled via said digital storage to said digital arithmetic circuit for the formation of the quotient.

* * * * *